(12) United States Patent
Agata

(10) Patent No.: US 7,955,700 B2
(45) Date of Patent: Jun. 7, 2011

(54) GAS-BARRIER LAMINATE FILM AND METHOD FOR PRODUCING SAME, AND IMAGE DISPLAY DEVICE

(75) Inventor: Yuya Agata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 710 days.

(21) Appl. No.: 11/727,823

(22) Filed: Mar. 28, 2007

(65) Prior Publication Data
US 2007/0231592 A1    Oct. 4, 2007

(30) Foreign Application Priority Data

Mar. 29, 2006    (JP) ................................. 2006-091713

(51) Int. Cl.
*B32B 9/04* (2006.01)
*B32B 9/00* (2006.01)

(52) U.S. Cl. ...................... 428/411.1; 428/688; 428/698

(58) Field of Classification Search .......................... None
See application file for complete search history.

(56) References Cited

U.S. PATENT DOCUMENTS

| 5,004,646 A | * | 4/1991 | Benham et al. | ............... 428/344 |
| 2005/0175831 A1 | | 8/2005 | Kim et al. | |

FOREIGN PATENT DOCUMENTS

| JP | S52-110738 A | 9/1977 |
| JP | 2003-89164 A | 3/2003 |
| JP | 2004-209716 A | 7/2004 |
| JP | 2005-54080 A | 3/2005 |
| JP | 2005-246716 A | 9/2005 |
| JP | 2006-35804 A | 2/2006 |
| WO | WO-03/030284 A1 | 4/2003 |

OTHER PUBLICATIONS

Japanese Office Action issued Apr. 12, 2011 in corresponding Japanese Application No. 2007-071291.

* cited by examiner

*Primary Examiner* — Sheeba Ahmed
(74) *Attorney, Agent, or Firm* — Birch, Stewart, Kolasch & Birch, LLP

(57) ABSTRACT

A method for producing a gas-barrier laminate film comprising at least one inorganic layer and at least one organic layer on a substrate film, which comprises forming the organic layer by polymerizing a monomer composition comprising an acrylate monomer having a phosphate ester group, a monomer having a phosphate ester group or their mixture. The produced gas-barrier laminate film maintains its excellent gas-barrier property even when folded.

18 Claims, No Drawings

GAS-BARRIER LAMINATE FILM AND METHOD FOR PRODUCING SAME, AND IMAGE DISPLAY DEVICE

BACKGROUND OF THE INVENTION

1. Field of the Invention

The present invention relates to a gas-barrier laminate film having excellent gas-barrier capability, and to a method for producing it. More precisely, the invention relates to a gas-barrier laminate film favorably usable in various image display devices, in particular, to a gas-barrier laminate film useful as a substrate for flexible organic electroluminescent devices (hereinafter referred to as "organic EL devices") and to a method for producing it, and also to an organic EL device.

2. Description of the Related Art

Heretofore, a gas-barrier laminate film fabricated by forming a thin metal oxide film of aluminium oxide, magnesium oxide or silicon oxide on the surface of a plastic substrate or a film is widely used for wrapping or packaging articles that require shielding from various gases such as water vapor or oxygen and for wrapping or packaging edibles, industrial articles and medicines for preventing them from being deteriorated. Apart from its applications for wrapping and packaging articles, in addition, the gas-barrier laminate film is being used in liquid-crystal display devices, solar cells and EL devices.

In recent development of image display devices such as liquid-crystal display devices and EL devices, the transparent substrate to constitute these devices is required to be lightweight and has a large panel size and, in addition, it is further required to satisfy high-level requirements in that it has long-term reliability and has a lot of latitude in designing its shape and that it enables curved-face display. For the transparent substrate capable of satisfying such high-level requirements, a plastic substrate is being used as a new substrate substitutable for a conventional glass substrate that is heavy and readily cracked or broken and hardly worked into a large-size panel. Not only satisfying the above requirements, but also the plastic substrate is applicable to a roll-to-roll system, and therefore it is more advantageous than a glass substrate in that the producibility with it is high and the production cost with it is low.

However, the substrate film of transparent plastics or the like is problematic in that its gas-barrier property is inferior to that of a glass substrate. When a substrate having a poor gas-barrier property is used, water vapor and air may penetrate through it; and, for example, when it is used in liquid-crystal display devices, the liquid crystal in the liquid-crystal cell may be degraded and the degraded part may be a display failure, thereby worsening the display quality of the devices. For solving the problem, a gas-barrier laminate film that comprises a thin metal oxide film formed on a substrate film has been developed. For example, as a gas-barrier laminate film for use in wrapping materials and liquid-crystal display devices, there are known a plastic film coated with silicon oxide through vapor deposition (see JP-B-53-12953, Examples), and a plastic film coated with aluminium oxide through vapor deposition (see JP-A-58-217344, Examples). These have a water-vapor barrier level of 1 g/m$^2$·day or so.

However, in large-panel liquid-crystal display devices and high-definition display devices developed these days, the necessary gas-barrier performance of the plastic film substrate is 0.1 g/m$^2$·day or so as the water-vapor barrier level thereof. Further recently, the development of organic EL devices and high-definition color liquid-crystal display devices that are required to have a higher gas-barrier level is being more promoted, and a transparent substrate that keeps a transparency applicable to them and has a higher gas-barrier level, especially a higher water-vapor barrier level of less than 0.1 g/m$^2$·day is being required.

To satisfy these requirements, some methods expected to produce a higher gas-barrier level have been investigated, for example, a sputtering method of forming a thin film by the use of a plasma generated through glow discharge under low pressure, and a CVD method for film formation. In addition, also proposed is an organic light-emitting device provided with a barrier film having an alternate laminate structure of organic layer/inorganic layer fabricated according to a vacuum evaporation method (see U.S. Pat. No. 6,268,695, page 4 [2 to 5] to page 5 [4 to 49]). However, since the folding resistance of the device is unsatisfactory, the device could not be applicable to flexible image display devices.

For giving the necessary folding resistance enough for application to flexible image displays to a plastic film, disclosed is a technique of using a polymer formed through polymerization of an acrylic monomer and having a volume shrinkage of less than 10% as an organic layer of the film (see JP-A-2003-53881, page 3 [0006] to page 4 [0008]). However, this technique is problematic in that the gas-barrier property of the film is not good.

Accordingly, it is desired to develop a plastic film having both good gas-barrier property and good folding resistance on the level applicable to flexible image display devices.

SUMMARY OF THE INVENTION

The present invention has been made in consideration of the above-mentioned problems, and one object of the invention is to provide a gas-barrier laminate film capable of maintaining its excellent gas-barrier property even when folded. Another object of the invention is to provide a durable image display device comprising the gas-barrier laminate film.

We, the present inventors have assiduously studied the reasons for the problems in the prior art and, as a result, have found that one reason is that the adhesiveness between the inorganic layer and the organic layer formed on the substrate film is insufficient. Given that situation, we have further studied to improve the gas-barrier property and the folding resistance of the gas-barrier laminate film with sufficiently keeping the adhesiveness between the inorganic layer and the organic layer, and, as a result, have reached the present invention described below.

[1] A method for producing a gas-barrier laminate film comprising a least one inorganic layer and at least one organic layer on a substrate film, which comprises forming the organic layer by polymerizing a monomer composition comprising an acrylate monomer having a phosphate ester group, a methacrylate monomer having a phosphate ester group or a mixture thereof.

[2] The method for producing a gas-barrier laminate film of [1], wherein the acrylate monomer having a phosphate ester group and the methacrylate monomer having a phosphate ester group are represented by the following formula (1):

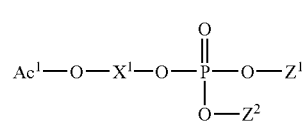

Formula (1)

wherein $Z^1$ represents $Ac^2$—O—$X^2$—, a substituent not having a polymerizable group or a hydrogen atom;

$Z^2$ represents $Ac^3$—O—$X^3$—, a substituent not having a polymerizable group, or a hydrogen atom;

$Ac^1$, $Ac^2$ and $Ac^3$ each independently represent an acryloyl group or a methacryloyl group;

$X^1$, $X^2$ and $X^3$ each independently represent an alkylene group, an alkyleneoxy group, an alkyleneoxycarbonyl group, an alkylenecarbonyloxy group, or their combination.

[3] The method for producing a gas-barrier laminate film of [1] or [2], wherein the monomer composition contain from 1 to 50% by mass of the monomer of formula (1).

[4] The method for producing a gas-barrier laminate film of any one of [1] to [3], wherein the monomer composition contains a bifunctional acrylate monomer, a bifunctional methacrylate monomer or their mixture.

[5] The method for producing a gas-barrier laminate film of any one of [1] to [4], wherein the organic layer is formed through flash vapor deposition, and the monomer composition is polymerized in a vacuum of at most 100 Pa.

[6] The method for producing a gas-barrier laminate film of any one of [1] to [5], wherein the organic layer and the inorganic layer are laminated all the time in a vacuum of at most 100 Pa.

[7] A gas-barrier laminate film produced according to the production method of any one of [1] to [6].

[8] A gas-barrier laminate film having at least one inorganic layer and at least one organic layer on a substrate film, wherein the organic layer contains at least one polymer having a phosphate ester group.

[9] The gas-barrier laminate film of [7] or [8], wherein the organic layer and the inorganic layer are laminated in that order on the substrate film.

[10] The gas-barrier laminate film of any one of [7] to [9], wherein the inorganic layer and the organic layer are laminated in that order on the substrate film.

[11] The gas-barrier laminate film of any one of [7] to [10], which has at least one inorganic layer and at least one organic layer on both surfaces of the substrate film.

[12] The gas-barrier laminate film of any one of [7] to [11], which additionally has a transparent conductive layer.

[13] The gas-barrier laminate film of any one of [7] to [12], which has an oxygen permeability at 38° C. and a relative humidity 90% of at most 0.02 ml/(m²·day·atm), and has a water vapor permeability at 38° C. and a relative humidity 90% of at most 0.01 g/(m²·day).

[14] An image display device comprising the gas-barrier laminate film of any one of [7] to [13].

[15] The image display device of [14], which is flexible.

[16] The image display device of [14] or [15], which is an organic EL device.

The gas-barrier laminate film of the invention has high gas-barrier capability and excellent folding resistance. The image display device of the invention, comprising the gas-barrier laminate film having the characteristics as above, has high durability.

BEST MODE FOR CARRYING OUT THE INVENTION

The gas-barrier laminate film and the image display device of the invention are described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Gas-Barrier Laminate Film]
(Layer Constitution)

The gas-barrier laminate film of the invention has at least one inorganic layer and at least one organic layer on a substrate film. So far as it has an inorganic layer and an organic layer on a substrate film, it is not specifically defined in point of the number of the constitutive layers and of the mode of the layer lamination. For example, the laminate film may have an inorganic layer and an organic layer formed in that order on a substrate film; or may have an organic layer and an inorganic layer formed in that order n a substrate film. Preferably, the laminate film has an inorganic layer and an organic layer alternately formed on a substrate film. For example, one preferred example of the laminate film has an inorganic layer, an organic layer and an inorganic layer formed in that order on a substrate film. Preferably, the number of the inorganic layer and the organic layer is from 1 to 10 each, more preferably from 1 to 5 each, even more preferably from 1 to 3 each. The inorganic layer and the organic layer may be formed only on one surface of the substrate film, but may be formed on both surfaces thereof.

A functional layer may be formed between the substrate film and the inorganic layer, or between the substrate film and the organic layer, or between the inorganic layer and the organic layer. Examples of the functional layer are optical functional layers such as an antireflection layer, a polarizing layer, a color filter, and a light emission efficiency-improving layer; mechanical functional layers such as a hard coat layer, and a stress-relaxing layer; electric functional layers such as an antistatic layer, and a conductive layer; and an antifogging layer; a contamination-resistant layer; a printable layer.

On the side (opposite side) of the substrate film opposite to the side thereof having an organic layer and a layer comprising a polymer having a phosphate ester group, a gas-barrier laminate layer may be provided that comprises at least an inorganic layer, an organic layer and an inorganic layer laminated in that order. The gas-barrier laminate layer provided on the film may be effective for preventing water molecules from penetrating into the film through the opposite side thereof. As a result, the dimensional change of the gas-barrier laminate film may be thereby prevented, and the inorganic layer may be protected from stress concentration therein and may be prevented from being broken, and therefore the durability of the laminate film may be further more improved.

The layers constituting the gas-barrier laminate film of the invention are described in detail hereinunder.

(Organic Layer)

The organic layer that constitutes the gas-barrier laminate film of the invention is characterized in that it contains a polymer having a phosphate ester group. The polymer having a phosphate ester group may be produced by polymerizing a monomer composition that contains a polymerizable monomer having a phosphate ester group.

The monomer having a phosphate ester group for use in the invention is preferably a compound of the following formula (1):

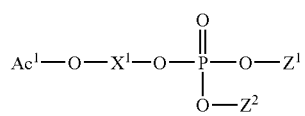

Formula (1)

In formula (1), $Z^1$ represents $Ac^2$—O—$X^2$—, a substituent not having a polymerizable group or a hydrogen atom; $Z^2$ represents $Ac^3-O-X^3-$, a substituent not having a polymerizable group, or a hydrogen atom; $Ac^1$, $Ac^2$ and $Ac^3$ each independently represent an acryloyl group or a methacryloyl group; $X^1$, $X^2$ and $X^3$ each independently represent an alkylene group, an alkyleneoxy group, an alkyleneoxycarbonyl group, an alkylenecarbonyloxy group, or their combination.

The formula (1) includes a monofunctional monomer of the following formula (2), a bifunctional monomer of the following formula (3), and a trifunctional monomer of the following formula (4):

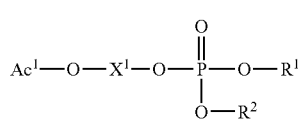

Formula (2)

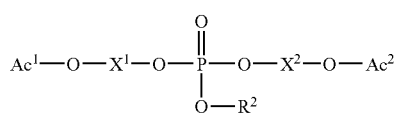

Formula (3)

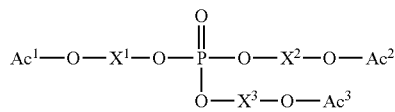

Formula (4)

$Ac^1$, $Ac^2$, $Ac^3$, $X^1$, $X^2$ and $X^3$ have the same meanings as in formula (1).

In formulae (2) and (3), $R^1$ represents a substituent not having a polymerizable group, or a hydrogen atom; and $R^2$ represents a substituent not having a polymerizable group, or a hydrogen atom.

In formulae (1) to (4), the number of the carbon atoms constituting $X^1$, $X^2$ and $X^3$ is preferably from 1 to 12, more preferably from 1 to 6, even more preferably from 1 to 4. Examples of the alkylene group for $X^1$, $X^2$ and $X^3$, and those of the alkylene moiety of the alkyleneoxy group, the alkyleneoxycarbonyl group and the alkylenecarbonyloxy group for $X^1$, $X^2$ and $X^3$ are a methylene group, an ethylene group, a propylene group, a butylene group, a pentylene group, a hexylene group. The alkylene group may be linear or branched, but is preferably a linear alkylene group. Preferably, $X^1$, $X^2$ and $X^3$ each are an alkylene group.

In formulae (1) to (4), the substituent not having a polymerizable group is, for example, an alkyl group, an alkoxy group, an aryl group, an aryloxy group or a group of their combination. Preferably, it is an alkyl group or an alkoxy group, more preferably an alkoxyl group.

The number of the carbon atoms constituting the alkyl group is preferably from 1 to 12, more preferably from 1 to 9, even more preferably from 1 to 6. Examples of the alkyl group are a methyl group, an ethyl group, a propyl group, a butyl group, a pentyl group, a hexyl group. The alkyl group may be linear or branched or may also be cyclic, but is preferably a linear alkyl group. The alkyl group may be substituted with an alkoxy group, an aryl group, an aryloxy group or the like.

The number of the carbon atoms constituting the aryl group is preferably from 6 to 14, more preferably from 6 to 10. Examples of the aryl group are a phenyl group, a 1-naphthyl group, a 2-naphthyl group. The aryl group may be substituted with an alkyl group, an alkoxy group, an aryloxy group or the like.

For the alkyl moiety of the alkoxy group and the aryl moiety of the aryloxy group, referred to are the descriptions of the above-mentioned alkyl group and aryl group.

In the invention, one or more different types of the monomers of formula (1) may be used either singly or as combined. When different types of the monomers are combined for use herein, two or more of the monofunctional monomers of formula (2), the bifunctional monomers of formula (3) and the trifunctional monomers of formula (4) may be combined.

In the invention, as the above-mentioned, polymerizable monomers having a phosphate ester group, commercially-available compounds such as Nippon Kayaku's KAYAMER series products and Unichemical's Phosmer series products may be used directly as they are, or newly produced compounds may be used.

Examples of the polymerizable monomers having a phosphate ester group are shown below, to which, however, the monomers for use in the invention should not be limited.

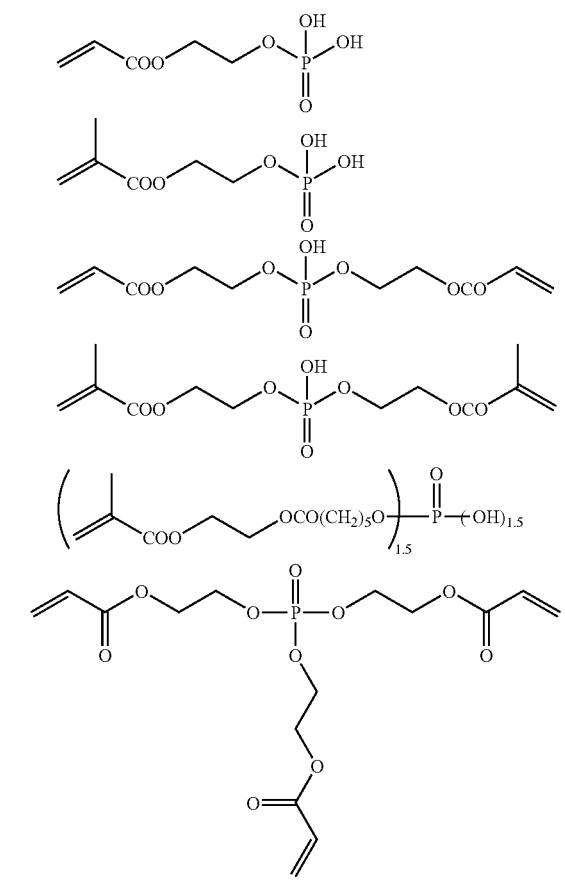

The monomer composition for use in the invention preferably contains any other polymerizable monomer not having a phosphate ester group, in addition to the polymerizable monomer having a phosphate ester group of formula (1). Preferred examples of the additional monomer are an acrylate monomer not having a phosphate ester group, and a methacrylate monomer not having a phosphate ester group. These acrylate monomer and methacrylate monomer may be monofunctional or may be bifunctional or more polyfunctional. Preferably, the monomer composition contains a bifunctional acrylate monomer or a bifunctional methacrylate monomer of the following formula (5), in an amount of from 50 to 99% by mass of the composition.

$Ac^{11}-O-L-O-Ac^{12}$   Formula (5)

In formula (5), $Ac^{11}$ and $Ac^{12}$ each independently represent an acryloyl group or a methacryloyl group; and L represents an acyclic alkylene group having at least 8 carbon atoms and not having an oxygen atom, a nitrogen atom and a sulfur atom in the chain thereof. The number of the carbon atoms constituting L is preferably from 8 to 19, more preferably from 8 to 14, even more preferably from 8 to 12. The alkylene group constituting L may be substituted or may be unsubstituted. One example of the substituent for the alkylene group is an alkyl group including, for example, a methyl group, an ethyl group, an n-propyl group, an n-butyl group, an n-pentyl group, an n-hexyl group. The number of the carbon atoms constituting the alkyl group is preferably from 1 to 6, more preferably from 2 to 4.

Examples of the bifunctional monomer of formula (5) are shown below, to which, the bifunctional monomer for use in the invention should not be limited.

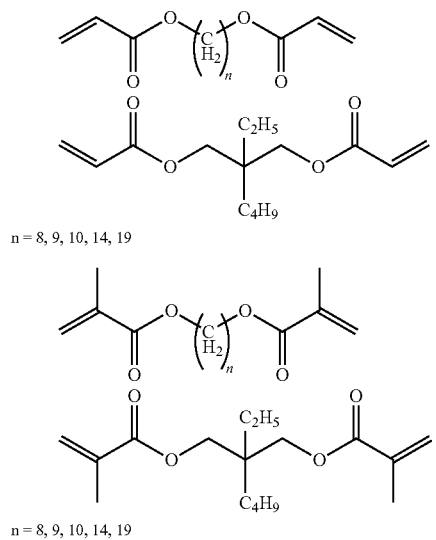

n = 8, 9, 10, 14, 19 n = 8, 9, 10, 14, 19

The monomer composition for use in the invention may contain one or more different types of polymerizable monomers not having a phosphate ester group either singly or as combined Preferably, the monomer composition for use in the invention contains from 1 to 50% by mass, more preferably from 5 to 30% by mass, even more preferably from 10 to 20% by mass of a monomer having a phosphate ester group. When the phosphate monomer content of the monomer composition is from 1 to 50% by mass, then the organic layer to be formed may readily better its adhesiveness to the adjacent inorganic layer and the bas-barrier property of the laminate film.

The organic layer may be formed according to a coating method or a vacuum film formation method. The coating method includes, for example, a dipping method, an air-knife coating method, a curtain coating method, a roller coating method, a wire-bar coating method, a gravure coating method, a slide coating method, a spraying method, and an extrusion-coating method using a hopper as in U.S. Pat. No. 2,681,294. Not specifically defined, the vacuum film formation method is preferably a vapor deposition of plasma CVD film formation method, more preferably a resistance heating vapor evaporation method in which the film-forming speed of the organic substance monomer used is easy to control. Not specifically defined, the vacuum film formation method is preferably a flash vapor deposition method as in U.S. Pat. Nos. 4,842,893, 4,954,371, 5,032,461.

Not specifically defined, the monomer is preferably polymerized through thermal polymerization or active energy ray-assisted polymerization. Of those, more preferred is active energy ray-assisted polymerization since the polymerization device may be readily fitted in a vacuum chamber and since the monomer may be readily crosslinked into a polymer having an increased high molecular weight. The active energy ray means radiations capable of propagating energy through irradiation with UV rays, X rays, electron beams, IR rays, microwaves; and their type and energy may be suitably selected depending on their use.

For photopolymerization, a photopolymerization initiator is used. Examples of the photopolymerization initiator are Ciba Speciality Chemicals' commercial products, Irgacure series (e.g., Irgacure 651, Irgacure 754, Irgacure 184, Irgacure 2959, Irgacure 907, Irgacure 369, Irgacure 379, Irgacure 819), Darocure series (e.g., Darocure TPO, Darocure 1173), Quantacure PDO; Sartomer's commercial products, Ezacure series (e.g., Ezacure TZM, Ezacure TZT). Preferably, the monomer is polymerized after the monomer composition has been put on a substrate film.

The light to which the monomer is exposed is, in general, preferably UV rays from a high-pressure mercury lamp or a low-pressure mercury lamp. The irradiation energy is preferably at least 0.5 J/cm$^2$, more preferably at least 2 J/cm$^2$. Since the polymerization of acrylate and methacrylate is retarded by oxygen in air, it is desirable that the oxygen concentration or the oxygen partial pressure during polymerization is low. In case where the oxygen concentration during polymerization is lowered according to a nitrogen purging method, the oxygen concentration is preferably at most 2%, more preferably at most 0.5%. In case where the oxygen partial pressure during polymerization is lowered according to a pressure-reducing method, the total pressure is preferably at most 1000 Pa, more preferably at most 100 Pa. Especially preferably, the monomer is polymerized through UV irradiation under a reduced pressure of at most 100 Pa at an energy irradiation level of at least 2 J/cm$^2$.

The organic layer may contain a polymer not having a structural unit of formula (1). Examples of the polymer are polyester, methacrylic acid-maleic acid copolymer, polystyrene, transparent fluororesin, polyimide, fluoropolyimide, polyamide, polyamidimide, polyetherimide, cellulose acylate, polyurethane, polyether-ether-ketone, polycarbonate, alicyclic polyolefin, polyarylate, polyether-sulfone, polysulfone, fluorene ring-modified polycarbonate, alicyclic-modified polycarbonate, fluorene ring-modified polyester. The content of the polymer not having the structural unit of formula (1) in the organic layer is preferably from 1 to 30% by mass, more preferably from 1 to 20% by mass, even more preferably from 5 to 10% by mass.

Not specifically defined, the thickness of the organic layer comprising a polymer having a phosphate ester group is preferably from 10 nm to 5 μm, more preferably from 10 nm to 2 μm, even more preferably from 10 nm to 1 μm.

(Inorganic Layer)

The inorganic layer is generally a thin layer of a metal compound. Not specifically defined, the component in the inorganic layer may be, for example, an oxide, a nitride or an oxinitride of at least one metal selected from Si, Al, In, Sn, Zn, Ti, Cu, Ce, Zr, Ta. Of those, preferred are an oxide, a nitride and an oxinitride of a metal selected from Si, Al, In, Sn, Zn, Zr, Ti; and more preferred are an oxide, a nitride and an oxinitride of a metal selected from Si, Al, Sn, Zr, Ti. Also preferred is an inorganic layer of their composite. The layer may contain any other element than the above, as a subsidiary component.

For forming the inorganic layer, employable are physical vapor-phase deposition method (PVD) such as a vapor evaporation method, a sputtering method or an ion-plating method; various chemical vapor-phase deposition method (CVD); and liquid-phase deposition method such as a plating method or a sol-gel method. Of those, preferred are chemical vapor-phase deposition methods (CVD) and physical vapor-phase deposition method (PVD) in which thermal influences on the substrate film in inorganic layer formation thereon may be evaded, the producing speed is high and a thin and uniform film is easy to form. Also preferred is a sol-gel method for inorganic layer formation, in which a thick film is easy to form. The thick film as referred to herein has a thickness of from 100 nm to 1 µm.

Preferably, the thickness of the inorganic layer is from 30 nm to 1 µm, more preferably from 50 to 200 nm. When the thickness of the inorganic layer is from 50 nm to 1 µm, then the layer is hardly influenced by the defective part thereof or by the part thereof having a low crystal density, and it may ensure high gas-barrier capability. In such a case, the inorganic layer is broken little even when it is deformed, and it is therefore favorable in practical use.

(Substrate Film)

The substrate film to be used in the gas-barrier laminate film of the invention is preferably selected from those having heat resistance in order that it may be used in image display devices to be mentioned hereinunder. Preferably, the substrate film is a heat-resistant transparent plastic film having a glass transition temperature (Tg) of 100° C. or higher and/or a linear thermal expansion coefficient of at most 40 ppm/° C. Tg and the linear expansion coefficient may be varied by changing the additives to the film.

The polymer for the substrate film may be any of thermoplastic polymer and thermosetting polymer. The thermoplastic polymer is preferably such that Tg of the polymer alone is from 130 to 300° C., more preferably from 160 to 250° C. For attaining optical uniformity of the film, the polymer is preferably amorphous polymer. The thermoplastic resin satisfying the requirements includes the following (the parenthesized data indicate Tg):

Polycarbonate (Pc: 140° C.), alicyclic polyolefin (e.g., Nippon Zeon's Zeonoa 1600: 160° C.), polyarylate (PAr: 210° C.), polyether sulfone (PES: 220° C.), polysulfone (PSF: 190° C.), cycloolefin copolymer (COC: compound described in JP-A-2001-150584: 162° C.), fluorene ring-modified polycarbonate (BCF-PC: compound described in JP-A-2000-227603: 225° C.), alicyclic-modified polycarbonate (IP-PC: compound described in JP-A-2000-227603: 205° C.), acryloyl compound (described in JP-A-2002-80616: 300° C. or higher). Alicyclic polyolefin is especially preferred for transparent films.

The thermosetting polymer includes epoxy resin and radiation-curable resin. The epoxy resin includes polyphenol-type resin, bisphenol-type resin, halogenobisphenol-type resin, and novolak-type resin. The curing agent for curing the epoxy resin may be any known one. For example, it includes amines, polyamino-amides, acids and acid anhydrides, imidazoles, mercaptans and phenolic resins. Above all, preferred are acid anhydrides, acid anhydride structure-having polymers and aliphatic amines, from the viewpoint of their solvent resistance, optical properties and thermal properties; and more preferred are acid anhydrides and acid anhydride structure-having polymers. In addition, a suitable amount of a curing catalyst such as a known tertiary amine or imidazole is preferably added to the polymer.

The radiation-curable resin is a resin that is cured through irradiation with radiations such as UV rays or electron beams. Concretely, it is a resin having an unsaturated double bond such as an acryloyl group, a methacryloyl group or a vinyl group in the molecule or the unit structure thereof. Of those, preferred is an acrylic resin having an acryloyl group. One or more different types of such radiation-curable resins may be used herein either singly or as combined. However, preferred for use herein is an acrylic resin having at least two acryloyl groups in the molecule or the unit structure thereof. The polyfunctional acrylate resin of the type includes, for example, urethane acrylate, ester acrylate and epoxy acrylate, to which, however, the resin usable in the invention should not be limited.

In case where the radiation-curable resin is processed according to an UV-curing method, a suitable amount of a known photoreaction initiator is added to the resin.

A hydrolyzed alkoxysilane or a silane-coupling agent may be added to the above-mentioned epoxy resin and radiation-curable resin for the purpose of further enhancing the polymer molecule interaction. The silane-coupling agent is preferably such that one has a hydrolyzable reactive group such as a methoxy group, an ethoxy group or an acetoxy group and the other has an epoxy group, a vinyl group, an amino group, a halogen atom or a mercapto group. In this case, the agent preferably has a vinyl group having the same reactive group for the purpose of fixing to the main ingredient resin. For example, herein employable are Shin-etsu Chemical Industry's KBM-503 and KBM-803, and Nippon Unicar's A-187. Preferably, its amount to be added to the resin is from 0.2 to 3% by mass.

When the gas-barrier laminate film of the invention is used in display devices such as image display devices, the substrate film therein is preferably a transparent substrate film having a light transmittance of at least 80%, more preferably at least 85%, even more preferably at least 90%. When the light transmittance of the substrate film is at least 80%, then the laminate film may be favorably used in organic EL devices to be mentioned hereinunder.

When the laminate film is used for applications not always requiring its transparency, for example, when it is used in displays not on the viewers' side thereof or is used for non-transparent wrapping or packaging materials, it is needless to say that a non-transparent material may be used in the film. For example, the non-transparent material includes polyimide, polyacrylonitrile, and known liquid-crystal polymer.

The light transmittance used in this description as the criterion of transparency may be determined by analyzing a film according to the method described in JIS-K7105 and using an integrating sphere-type light transmittance meter, thereby measuring the total light transmittance and the scattered light quantity through the film, followed by subtracting the diffused transmittance from the total light transmittance.

(Transparent Conductive Layer)

A transparent conductive layer may be laminated on at least one side of the laminate film of the invention. The transparent conductive layer may be formed of a known metal film or metal oxide film. Above all, preferably used for the transparent conductive film is a metal oxide film having good transparency, good conductivity and good mechanical properties. The metal oxide film includes, for example, metal oxide films of indium oxide, cadmium oxide or tin oxide with any of tin, tellurium, cadmium, molybdenum, tungsten, fluorine, zinc or germanium added thereto as an impurity; and metal oxide films of zinc oxide or titanium oxide with aluminium added thereto as an impurity. Of those, preferred is a thin film of indium oxide that comprises tin oxide as the essential ingredient thereof and contains from 2 to 15% by mass of zinc oxide, as its transparency and conductivity are good.

The transparent conductive film may be formed in any method capable of forming the intended thin film. For example, preferred is a vapor-phase deposition method of forming a film through deposition of a vapor-phase material, such as a sputtering method, a vacuum evaporation method, an ion-plating method, a plasma CVD method, a Cat-CVD method. For example, the film may be formed according to the methods described in Japanese Patent 3400324, JP-A-2002-322561, JP-A-2002-361774. Above all, preferred is a sputtering method as giving films of good conductivity and transparency.

The vacuum degree in the sputtering method, vacuum evaporation method, ion-plating method or plasma CVD method to be employed in the invention is preferably from 0.133 mPa to 6.65 Pa, more preferably from 0.665 mPa to 1.33 Pa. Before forming the transparent conductive layer thereon, the substrate film is preferably subjected to surface treatment, for example, through plasma treatment (back-sputtering) or corona treatment. While the transparent conductive layer is formed thereon, the substrate film may be heated at 50 to 200° C.

The thickness of the thus-formed transparent conductive layer is preferably from 20 to 500 nm, more preferably from 50 to 300 nm.

The surface electric resistivity of the transparent conductive layer, as measured at 25° C. and a relative humidity of 60%, is preferably from 0.1 to 200 Ω/square, more preferably from 0.1 to 100 Ω/square, even more preferably from 0.5 to 60 Ω/square. The light transmittance of the transparent conductive layer is preferably at least 80%, more preferably at least 83%, even more preferably at least 85%.

(Characteristics and Utilization of Gas-Barrier Laminate Film)

The gas-barrier laminate film of the invention has a low oxygen permeability and a low water vapor permeability, and has an excellent gas-barrier property. Concretely, the invention may provide a laminate film having an oxygen permeability at 38° C. and a relative humidity 10%, of at most 0.01 ml/(m$^2$·day·atm) It may provide a laminate film having an oxygen permeability at 38° C. and a relative humidity 90%, of at most 0.02 ml/(m$^2$·day·atm), preferably at most 0.01 ml/(m$^2$·day·atm). It may provide a laminate film having a water vapor permeability at 38° C. and a relative humidity 90%, of at most 0.01 g/(m$^2$·day). The laminate film of the invention may still keep its excellent gas-barrier property even after it is folded plural times. In addition, the laminate film of the invention is characterized in that the adhesiveness between the inorganic layer and the organic layer is high.

Having the characteristics as above, the gas-barrier laminate film of the invention may be effectively applicable to various articles and flexible articles that are required to be shielded from water vapor and oxygen. For example, it may be used for food-wrapping films, industrial product-wrapping films, medicine-wrapping films, substrate films for flexible displays, substrate films for flat panel displays, substrate films for solar cells, substrate films for touch panels, substrate films for flexible circuits, protective films for optical discs, optical films, phase retardation films, protective films for polarizers, transparent conductive films, etc.

[Image Display Device]

In particular, the gas-barrier laminate film of the invention is effectively used in image display devices. The image display device as referred to herein is meant to indicate all devices having an image display function, including, for example, circularly-polarizing plates, liquid-crystal display devices, organic EL devices, electronic papers. In these image display devices, the gas-barrier laminate film of the invention is used favorably as a substrate or a sealant film. Since the gas-barrier laminate film of the invention has excellent flexibility, anyone may effectively take advantage of its characteristics when using it in flexible image display devices. The word "flexible" as referred to herein means the function of a device of such that the shape of the site of the device to which the gas barrier laminate film is fitted is not fixed and may be varied depending on the use of the device.

The circularly-polarizing plate, the liquid-crystal display device and the organic EL device in which the gas-barrier laminate film of the invention is favorably used are described below.

(Circular Polarizing Plate)

The circular polarizing plate can be manufactured by laminating a λ/4 plate and a polarizing plate on the gas barrier laminate film of the invention. In this case, they are laminated such that the phase delay axis of the λ/4 plate and the absorption axis of the polarizing plate form an angle of 45°. A polarizing plate stretched in 45° direction relative to the longitudinal direction (MD) is used preferably and, those, for example, disclosed in JP-A-2002-865554 can be used suitably.

(Liquid Crystal Display Device)

A liquid crystal display device is generally classified into a reflection type liquid crystal display device and a transmission type liquid crystal display device.

The reflection type liquid crystal display device has a lower substrate, a reflection electrode, a lower orientation film, a liquid crystal layer, an upper orientation film, a transparent electrode, an upper substrate, a λ/4 plate, and a polarizing film orderly from below. The gas barrier film of the invention can be used as the transparent electrode and the upper substrate. In a case of providing the reflection type liquid crystal display device with a color display function, a color filter layer is preferably situated further between the reflection electrode and the lower orientation film, or between the upper orientation film and the transparent electrode.

Further, the transmission type liquid crystal display device has a back light, a polarizing plate, a λ/4 plate, a lower transparent electrode, a lower orientation film, a liquid crystal layer, an upper orientation film, an upper transparent electrode, an upper substrate, a λ/4 plate, and a polarizing film orderly from below. Among them, the gas barrier laminate film of the invention can be used as the upper transparent electrode and the upper substrate. Further, in a case of providing the transmission type liquid crystal display device with the color display function, it is preferred that a color filter layer is preferably situated further between the lower transparent electrode and the lower orientation film, or between the upper orientation film and the transparent electrode.

While the structure of liquid crystal layer is not particularly limited, it is, preferably, for example, a TN (Twisted Nematic) type, an STN (Supper Twisted Nematic) type, a HAN (Hybrid Aligned Nematic) type, a VA (Vertically Alignment) type, an ECB (Electrically Controlled Birefringence) type, an OCB (Optically Compensatory Bend) type, or a CPA (Continuous Pinwheel Alignment) type.

[Organic EL Device]

The gas barrier laminate film of the invention can be particularly preferably used as a organic EL devise.

The organic EL device has a cathode and an anode on a substrate and has an organic compound layer containing an organic light emitting layer (hereinafter sometimes simply referred to as "light emitting layer") between both of the electrodes. In view of the property of the light emitting device, at least one of the anode and the cathode is preferably transparent.

As the form of the lamination of the organic compound layer in the invention, it is preferred such a form that a hole transporting layer, a light emitting layer, and an electron transporting layer are laminated in this order from the side of the anode. Further, a charge blocking layer or the like may be present between the hole transporting layer and the light emitting layer or between the light emitting layer and the electron transporting layer. A hole injecting layer may be provided between the anode and the hole transporting layer and an electron injecting layer may be present between the cathode and the electron transporting layer. Each of the layers may be divided into a plurality of secondary layers.

(Anode)

It may usually suffice that the anode has a function as an electrode for supplying holes to the organic compound layer and the shape, structure, size, etc. thereof are not particularly limited and can be selected properly from known electrode materials in accordance with the application use and the purpose of the light emitting device. As described above, the anode is formed usually as a transparent anode.

The material for the anode includes preferably, for example, metals, alloys, metal oxides, conductive compounds or mixtures of them. Specific examples of the anode material include conductive metal oxides such as tin oxide doped with antimony, fluorine, etc. (ATO, FTO), tin oxide, zinc oxide, indium oxide, indium tin oxide (ITO), and indium zinc oxide (IZO), metals such as gold, silver, chromium, and nickel, as well as mixtures or laminates of such metals with conductive metal oxides, inorganic conductive materials such as copper iodide, and copper sulfide, organic conductive materials such as polyaniline, polythiophene and polypyrrole, and laminates thereof with ITO. Among them, preferred are conductive metal oxides, and ITO is particularly preferred with a view point of productivity, high conductivity, transparency, etc.

The anode can be formed on the substrate in accordance with a method selected properly, for example, from wet method such as a printing method and a coating method, physical method such as a vacuum vapor deposition method, a sputtering method, and an ion plating method, and chemical method such as CVD or plasma CVD while considering the adaptability with the material constituting the anode. For example, in a case of selecting ITO as the material for the anode, the anode can be formed in accordance with a DC or RF sputtering method, a vacuum deposition method, an ion plating method, etc.

In the organic EL device of the invention, the position for forming the anode is not particularly limited and can be selected properly in accordance with the application use and the purpose of the light emitting device and it is preferably formed on the substrate. In this case, the anode may be formed entirely or partially on one of the surfaces of the substrate.

Patterning upon forming the anode may be conducted by chemical etching adopting photolithography, etc., or by physical etching adopting laser, etc. Further, the patterning may be conducted by vapor deposition, sputtering, etc. while stacking a mask, or by a lift-off method or a printing method.

The thickness of the anode can be selected properly depending on the material constituting the anode and, while it can not be determined generally, it is usually about from 10 nm to 50 µm and, preferably, from 50 nm to 20 nm.

The resistance value of the anode is, preferably, $10^3 \Omega/\square$ or less and, more preferably, $10^2 \Omega/\square$ or less. In a case where the anode is transparent, it may be colorless transparent or colored transparent. For taking out light emission from the side of the transparent anode, the transmittance is, preferably, 60% or higher and, more preferably, 70% or higher.

The transparent anode is described specifically in "New Development of Transparent Electrode Film", supervised by Yutaka Sawada, published from CMC (1999) and the matters described therein can be applied to the invention. In a case of using a plastic substrate of low heat resistance, a transparent anode using ITO or IZO and formed as a film at a low temperature of 150° C. or lower is preferred.

(Cathode)

It may usually suffice that the cathode has a function as an electrode for injecting electrons to the organic compound layer, and the shape, structure, size, etc. thereof are not particularly limited and can be selected properly from known electrode materials in accordance with the application use and the purpose of the light emitting device.

The material constituting the cathode includes, for example, metals, alloys, metal oxides, electroconductive compounds, and mixtures thereof. Specific examples include alkali metals (for example, Li, Na, K, and Cs), alkali earth metals (for example, Mg and Ca), gold, silver, lead, aluminum, sodium-potassium alloy, lithium-aluminum alloy, magnesium-silver alloy, indium, and rare earth metals such as ytterbium. They may be used alone or two or more of them can be preferably used in combination with a view point of making the stability and the electron injecting property compatible.

Among them, as the material constituting the cathode, alkali metals or alkali earth metals are preferred in view of the electron injecting property and materials mainly comprising aluminum are preferred with a view point of excellent storage stability.

Materials mainly comprising aluminum mean aluminum per se, alloys of aluminum and from 0.01 to 10 mass % of alkali metals or alkali earth metals, or mixtures thereof (for example, lithium-aluminum alloy, and magnesium-aluminum alloy).

The materials for the cathode are described specifically in JP-A-2-15595 and JP-A-5-121172 and the materials described in the publications can be applied also to the invention.

The method of forming the cathode is not particularly limited and it can be conducted in accordance with known methods. For example, the cathode can be formed in accordance with a method selected properly from wetting methods such as a printing method and a coating method, physical methods such as a vacuum vapor deposition method, a sputtering method or, an ion plating method, and chemical methods such as a CVD or plasma CVD method while considering the adaptability with the material constituting the cathode. For example, in a case of selecting metals or the like as a material for the cathode, it can be formed in accordance with a sputtering method, etc. by sputtering one of them or plurality of them simultaneously or successively.

Patterning upon forming the cathode may be conducted by chemical etching such as photolithography, or physical etching such as by laser, or it may be conducted by vacuum vapor deposition or sputtering while stacking a mask or by a lift off method or a printing method.

In the invention, the position for forming the cathode is not particularly limited and it may be formed entirely or partially on the organic compound layer.

Further, a dielectric layer of a fluoride or oxide of an alkali metal or alkali earth metal may be inserted at a thickness of from 0.1 to 5 nm between the cathode and the organic compound layer. The dielectric layer can be regarded as a sort of an electron injecting layer. The dielectric layer can be formed, for example, by a vacuum vapor deposition method, a sputtering method or an ion plating method.

The thickness of the cathode can be selected properly depending on the material constituting the cathode and, while it can not be defined generally, it is usually about from 10 nm to 5 μm and, preferably, from 50 nm to 1 μm.

The cathode may be transparent or not transparent. The transparent cathode can be formed by forming a thin film of the material of the cathode to a thickness of from 1 to 10 nm and, further, laminating a transparent conductive material such as ITO or IZO.

(Organic Compound Layer)

The organic compound layer in the invention is to be described.

The organic EL device of the invention has at least one organic compound layer containing at least a light emitting layer. Other organic compound layers than the organic light emitting layer include layers such as a hole transporting layer, an electron transporting layer, a charge blocking layer, a hole injecting layer, and an electron injecting layer respectively as described above.

In the organic EL device of the invention, each of the layers constituting the organic compound layer can be formed suitably by any of dry film forming methods such as a vapor deposition method or a sputtering method, a transfer method, a printing method, etc.

(1) Organic Light Emitting Layer

The organic light emitting layer is a layer having a function of accepting holes from the anode, the hole injecting layer, or the hole transporting layer and accepting electrons from the cathode, the electron injecting layer, or the electron transporting layer upon application of an electric field, and providing a site for re-combination of hole and electron to emit light.

The light emitting layer in the invention may be formed only of a light emitting material, or may be formed of a mixture of a host material and light emitting material. The light emitting material may be a fluorescent material or a phosphorescent material, and the dopant may be of one or plural kinds. The host material is, preferably, a change transporting material. The host material may be of one kind or plural kinds and includes, for example, a mixture of an electron transporting host material and a hole transporting host material. Further, it may also contain a material not having charge transportability and not emitting light in the light emitting layer.

Further, the light emitting layer may have one or more layers and each of the layers may emit light at different emission colors.

Examples of the fluorescent material usable in the invention include, for example, various metal complexes typically represented by metal complexes of benzoxazole derivatives, imidazole derivatives, benzothiazole derivatives, styrylbenzene derivatives, polyphenyl derivatives, diphenyl butadiene derivatives, tetraphenyl butadiene derivatives, naphthalimide derivatives, coumarine derivatives, condensed aromatic compound, perynone derivatives, oxadiazole derivatives, oxazine derivatives, aldazine derivatives, pyralidine derivatives, cyclopentadiene derivatives, bisstyryl anthracene derivatives, quinacridone derivatives, pyrrolopyridine derivatives, thiadiazolopyridine derivatives, cyclopentadiene derivatives, styrylamine derivatives, diketopyrrolopyrole derivatives, aromatic dimethylidene compound, and 8-quinolinole derivatives, and metal complexes of pyrrometene derivatives, polymer compounds such as polythiophene, polyphenylene and compounds such as polyphenylene vinylene, and organic silane derivatives.

Further, the phosphorescent materials usable in the invention includes, for example, complexes containing transition metal atoms or lanthanoide atoms.

The transition metal atoms are not particularly limited and include, preferably, ruthenium, rhodium, palladium, tungsten, rhenium, osmium, iridium, and platinum and, more preferably, rhenium, iridium and platinum.

The lanthanoide atoms include lanthanum, cerium, praseodymium, neodymium, samarium, europium, gadolinium, terbium, dysprosium, holmium, erbium, thulium, ytterbium, and lutetium. Among the lanthanoide atoms, neodymium, europium, and gadolinium are preferred.

Ligands of complexes include those ligands, described, for example, in "Comprehensive Coordination Chemistry", written by G. Wilkinson, et al., published from Pergamon Press in 1987, "Photochemistry and Photophysics of Coordination Compounds" written by H. Yersin, published from Springer-Verlag Co. in 1987, and "Organic Metal Chemistry—Foundation and Application—" written by Akio Yamamoto, published from Shokabo Co. in 1982, etc.

Specific ligands are, preferably, halogen ligands (preferably, chlorine ligand), nitrogen-containing heterocyclic ligands (for example, phenylpyridine, benzoquinoline, quinolinol, bipyridyl, and phenanthroline), diketone ligands (for example, acetylacetone), carboxylic acid ligands (for example, acetic acid ligand), carbon monoxide ligand, isonitrile ligand, and cyano ligand and, more preferably, nitrogen-containing heterocyclic ligands. The complexes described above may have one transition metal atom in the compound or may be a so-called composite nuclei complexes having two or more of them. Metal atoms of different kinds may be contained together.

The phosphorescent material is contained in the light emitting layer by, preferably, from 0.1 to 40 mass % and, more preferably, from 0.5 to 20 mass %.

Further, the host materials contained in the light emitting layer in the invention include, for example, those having carbazole skeleton, having diarylamine skeleton, having pyridine skeleton, having pyrazine skeleton, having triazine skeleton, and having arylsilane skeleton, or those materials exemplified in the columns for the hole injecting layer, the hole transporting layer, the electron injecting layer and the electron transporting layer to be described later.

The thickness of the light emitting layer is not particularly limited and usually it is, preferably, from 1 nm to 500 nm, more preferably, from 5 nm to 200 nm and, further preferably, from 10 nm to 100 nm.

(2) Hole Injecting Layer, Hole Transporting Layer

The hole injecting layer and the hole transporting layer are layers having a function of accepting holes from the anode or from the side of the anode and transporting them to the cathode. The hole injecting layer and the hole transporting layer are preferably layers containing specifically, for example, carbazole derivatives, triazole derivatives, oxazole derivatives, oxadiazole derivatives, imidazole derivatives, polyarylalkane derivatives, pyrazoline derivatives, pyrazolone derivatives, phenylenediamine derivatives, arylamine derivatives, amino-substituted chalcone derivatives, styrylanthracene derivatives, fluorenone derivatives, hydrazone derivatives, stylbene derivatives, silazene derivatives, aromatic tertiary amine compounds, styrylamine compounds, aromatic dimethylidine compounds, porphiline compounds, organic silane derivatives, and carbon.

The thickness of the hole injecting layer and the hole transporting layer is preferably each 500 nm or less with a view point of lowering the driving voltage.

The thickness of the hole transporting layer is, preferably, from 1 nm to 500 nm, more preferably, from 5 nm to 200 nm and, further preferably, from 10 nm to 100 nm. Further, the thickness of the hole injecting layer is, preferably, from 0.1 nm to 200 nm, more preferably, from 0.5 nm to 100 nm and, further preferably, from 1 nm to 100 nm.

The hole injecting layer and the hole transporting layer may be of a single layered structure comprising one or more of the materials described above or may be of a multi-layered structure comprising plural layers of an identical composition or different kinds of compositions.

(3) Electron Injecting Layer, Electron Transporting Layer

The electron injecting layer and the electron transporting layer are layers having a function of accepting electron from the cathode or from the side of the cathode and transporting them to the side of the anode. The electron injecting layer and the electron transporting layer are preferably layers containing, specifically, various kinds of metal complexes typically represented by metal complexes of triazole derivatives, oxazole derivatives, oxodiazole derivatives, imidazole derivatives, fluorenone derivatives, anthraquinodimethane derivatives, anthron derivatives, diphenylquinone derivatives, thiopyrane dioxide derivatives, carbodiimide derivatives, fluorenylidene methane derivatives, distyrylpyradine derivatives, aromatic ring tetracarboxylic acid anhydrides such as naphthalene and perylene, phthalocyanine derivatives, and 8-quinolinole derivatives, and metal complex having metal phthalocyanine, benzoxazole, or benzothiazole as the ligand, organic silane derivatives, etc.

The thickness of the electron injecting layer and the electron transporting layer is preferably from 500 nm or less respectively with a view point of lowering the driving voltage.

The thickness of the electron transporting layer is, preferably, from 1 nm to 500 nm, more preferably, from 5 nm to 200 nm and, further preferably, from 10 nm to 100 nm. Further, the thickness of the electron injecting layer is, preferably, from 0.1 nm to 200 nm, more preferably, from 0.2 nm to 100 nm and, further preferably, from 0.5 nm to 50 nm.

The electron injecting layer and the electron transporting layer may be of a single layered structure comprising one or more of the materials described above or a multi-layered structure comprising plural layers each of an identical composition or different kinds of compositions.

(4) Hole Blocking Layer

The hole blocking layer is a layer having a function of preventing holes transported from the anode to the light emitting layer from passing through to the side of the cathode. In the invention, the hole blocking layer can be provided as an organic compound layer adjacent with the light emitting layer on the side of the cathode. The electron transporting layer or the electron injecting layer may also have a function of the hole blocking layer.

Examples of the organic compound constituting the hole blocking layer include aluminum complexes such as $BAl_q$, triazole derivatives, and phenanthroline derivatives such as BCP.

The thickness of the hole blocking layer is, preferably, from 1 nm to 500 nm, more preferably, 5 nm to 200 nm and, further preferably, from 10 nm to 100 nm.

The hole blocking layer may be of a single layered structure comprising one or more kinds of the materials described above or a multi-layered structure comprising plural layers each of an identical composition or different kinds of compositions.

(Protective Layer)

In the invention, the entire organic EL device may be protected by a protective layer.

The material contained in the protective layer may be any material of suppressing intrusion of moisture or oxygen into the device that promotes deterioration of the device.

Specific examples include metals such as In, Sn, Pb, Au, Cu, Ag, Al, Ti, and Ni, metal oxides such as MgO, SiO, $SiO_2$, $Al_2O_3$, GeO, NiO, CaO, BaO, $Fe_2O_3$, $Y_2O_3$, and $TiO_2$, metal nitrides such as $SiN_x$, metal oxynitrides such as $SiN_xO_y$, metal carbides such as $SiC_w$ and $SiO_zC_w$, metal fluorides such as $MgF_2$, LiF, $AlF_3$, and $CaF_2$, polyethylene, polypropylene, polymethyl methacrylate, polyimide, polyurea, polytetrafluoroethylene, polychlorotrifluoroethylene, polydichlorodifluoroethylene, copolymer of chlorotrifluoroethylene and dichlorofluouroethylene, a copolymer obtained by copolymerizing tetrafluoroethylene and a monomer mixture containing at least one comonomer, a fluoro-containing copolymer having a cyclic structures in the copolymerization main chain, water absorbing material with a water absorptivity of 1% or more, and a moisture proofing material with a water absorptivity of 0.1% or less. Among them, metal oxides, metal nitride, or metal oxynitride are preferred and silicon oxides, silicon nitride, or silicon oxynitride are particularly preferred.

The method of forming the protective layer is not particularly limited and, for example, a vacuum vapor deposition method, a sputtering method, a reactive sputtering method, an MBE (Molecular Beam Epitaxy) method, a cluster ion beam method, an ion plating method, a plasma polymerization method (RF-excited ion plating method), a plasma CVD method, a laser CVD method, a thermal CVD method, a gas source CVD method, a coating method, a printing method, or a transfer method can be applied. The protective layer in this invention may be used as a conductive layer.

(Sealing)

Further, the organic EL device of the invention may be sealed for the entire device by using a sealing vessel.

Further, a water absorbent or an inert liquid may be sealed in a space between the sealing vessel and the light emitting device. The water absorbent is not particularly limited and includes, for example, barium oxide, sodium oxide, potassium oxide, calcium oxide, sodium sulfate, calcium sulfate, magnesium sulfate, phosphorous pentoxide, calcium chloride, magnesium chloride, copper chloride, cesium fluoride, niobium fluoride, calcium bromide, vanadium bromide, molecular sieve, zeolite, and magnesium oxide. The inert liquid is not particularly limited and includes, for example, paraffins, liquid paraffins, fluoro-solvents such as perfluoro alkanes or perfluoro amines and perfluoro ethers, chlorosolvents, and silicone oils.

A solid sealing method may be used as another sealing method. The solid sealing method is that, after the protective layer is formed on an organic EL device, an adhesive layer and a barrier type support layer are laminated thereon and then hardened. The materials of the adhesives are not particularly limited and, for example, a thermosetting epoxy resin and a photopolymer acrylate resin may be used. The barrier type support layer may be a grass or a gas barrier laminate film of the invention.

For still another sealing method, a layer sealing method may be used. The layer sealing method is that alternate laminate layers of inorganic layer and organic layer are formed on an organic EL device. The organic layer may be laminated by a protective layer before the alternate laminate layer is formed.

Light emission can be obtained from the organic EL device of the invention by applying a DC (may optionally containing AC component) voltage (usually from 2 to 15 V), or a DC current between the anode and the cathode.

For the driving method of the organic EL device of the invention, a driving method described in JP-A-2-148687, JP-A-6-301355, JP-A-5-29080, JP-A-7-134558, JP-A-8-234685, JP-A-8-241047, Japanese Patent 2784615, U.S. Pat. No. 5,828,429 and U.S. Pat. No. 6,023,308 can be applied.

In case where the gas-barrier laminate film of the invention is used in organic EL, etc., preferably employable herein are the techniques described in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617, JP-A-2002-056976, JP-A-2001-148291, JP-A-2001-221916 and JP-A-2001-231443. Specifically, the gas-barrier laminate film of the invention may be used not only as the substrate film in constructing organic EL devices but also as the protective film therein.

EXAMPLES

The characteristics of the invention are described more concretely with reference to the following Examples and Comparative Examples. In the following Examples, the material used, its amount and the ratio, the details of the treatment and the treatment process may be suitably modified or changed not overstepping the gist and the scope of the invention. Accordingly, the invention should not be limitatively interpreted by the Examples mentioned below.

Example 1

Fabrication of Laminate Film of the Invention

A polyethylene naphthalate film (Teijin DuPont's Teonex Q65FA) was cut into a 20 cm×20 cm piece to prepare a substrate film 1 for laminate film.

One g of acrylate having a phosphate ester group, compound (A) mentioned below (Nippon Kayaku's KAYAMER series, PM-21), 9 g of a photopolymerizable acrylate to be mixed with it, photopolymerizing compound mentioned below (Kyoei-sha Chemical's Light Acrylate BEPG-A, and 0.6 g of a photopolymerization initiator (Ciba-Geigy's IRGACURE 907) were prepared. These were dissolved in 190 g of methyl ethyl ketone to prepare a coating solution. Using a wire bar (#6), the coating solution was applied onto the smooth surface of the above-mentioned substrate film, and then irradiated with UV rays from an air-cooled, 160 W/cm metal halide lamp (by Eyegraphics) at an illumination intensity of 350 mW/cm² and at a dose of 500 mJ/cm² in a nitrogen-purged atmosphere having an oxygen concentration of at most 0.1%, thereby forming an organic layer having a thickness of about 500 nm. This is a film 2A. The following compound (B) (Kyoei-sha Chemical's Light Ester P-2M) was used in place of the compound (A), thereby forming an organic layer. This is a film 2B. The following compound (C) (Osaka Organic Chemistry's V#3PA) was used to form an organic layer. This is a film 2C.

Then, an inorganic layer of silicon oxide (SiOx) was formed on the organic layers of 2A to 2C. The inorganic layer was formed as follows, using a sputtering device. The target was Si, the discharge gas was argon and the reactive gas was oxygen. The thickness of the inorganic film was 50 nm. Thus fabricated, the laminate films are 3A to 3C.

On the inorganic silicon oxide layer of the laminate films 3A to 3C, the coating liquid used in forming the organic layer was further applied with a wire bar (#6), and then irradiated with UV rays from an air-cooled, 160 W/cm metal halide lamp (by Eyegraphics) at an illumination intensity of 350 mW/cm² and at a dose of 500 mJ/cm² in a nitrogen-purged atmosphere having an oxygen concentration of at most 0.1%, thereby forming an organic layer having a thickness of about 500 nm. Thus, laminate films 4A to 4C, having a constitution of organic layer/inorganic layer/organic layer/substrate, were fabricated.

On the surface opposite to the side having the formed barrier layer of laminate film 3C, an organic layer and an inorganic layer were formed by the above method to fabricate laminate film 3C-2 having a constitution of inorganic layer/organic layer/substrate/organic layer/inorganic layer.

Compound (A):

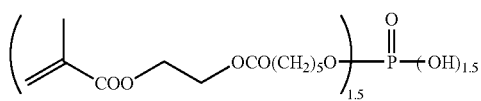

Compound (B):

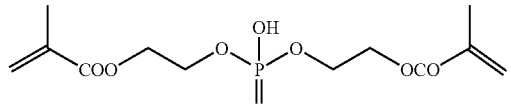

Compound (C):

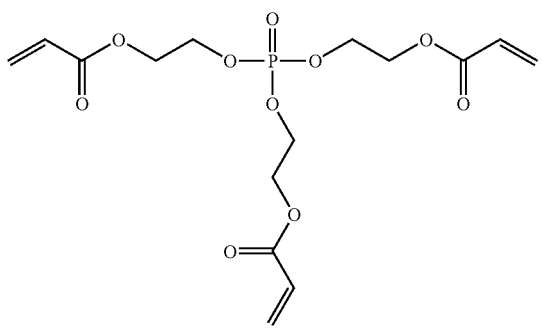

Photopolymerizable Compound:

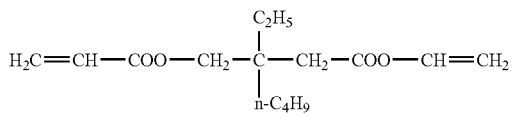

Comparative Examples

Organic layer films 2D, 2E, 2F and 2G were produced in the same manner as that for producing the organic layer film 2A in Example 1, for which, however, a polymerizable monomer not having a phosphate ester group was used in place of the compound (A) used in producing the film 2A. The polymerizable monomer not having a phosphate ester group is as follows: The following compound (D), hydroxyl group-having acrylate (Shin-Nakamura Chemical's TOPOLEN) was used in the film 2D. The following compound (E), carboxylic acid-having acrylate (Toa Gosei's M5300) was used in the film 2E. The following compound (F), acetylacetone structure-having acrylate (Aldrich's AAEMA) was used in the film 2F. The following compound (G), trifunctional acrylate (Kyoei-sha Chemical's Light Acrylate TMP-A) was used in the film 2G. In addition, using a mixture of the above photopolymerizable compound and initiator, an organic layer was formed. This is a film 2H.

Then, in the same manner as in Example 1, a silicon oxide film (50 nm) was formed on the organic layer of the organic layer films 2D to 2H, thereby fabricating laminate films 3D to 3H, respectively. On the inorganic layer of the laminate films 3D to 3H, the coating solution used in forming the organic layer in those films was applied and irradiated with UV rays also in the same manner as in Example 1, thereby forming a second organic layer thereon having a thickness of about 500 nm. Thus, laminate films 4D to 4H having a constitution of second organic layer/inorganic layer/organic layer/substrate were fabricated.

test, the laminate film was conditioned in an atmosphere at 25° C. and a relative humidity of 60% for 8 hours, and the test was carried out in the laboratory having the same atmosphere as that for the conditioning. After the test, the oxygen permeability and the water vapor permeability of the sample were determined at 38° C. and a relative humidity of 10% 90%, according to a MOCON process (oxygen:MOCON OX-TRAN 2/20L, water vapor:MOCON PERMATRAN-W (3)/31). The results are shown in Table 1.

TABLE 1

| Laminate Film | Oxygen Permeability 38° C., relative humidity 10% [ml/(m² · day · atm)] | Oxygen Permeability 38° C., relative humidity 90% [ml/(m² · day · atm)] | Water Vapor Permeability 38° C., relative humidity 90% [ml/(m² · day)] | Remarks |
|---|---|---|---|---|
| 3A | 0.01 | 0.02 | 0.009 | the Invention |
| 3B | 0.01 | 0.02 | 0.01 | the Invention |
| 3C | 0.01 | 0.01 | 0.008 | the Invention |
| 3C-2 | 0.01 | 0.01 | <0.005 | the invention |
| 3D | 0.11 | 0.20 | 0.10 | Comparative Example |
| 3E | 0.09 | 0.18 | 0.08 | Comparative Example |
| 3F | 0.08 | 0.16 | 0.09 | Comparative Example |
| 3G | 0.05 | 0.06 | 0.05 | Comparative Example |
| 3H | 0.12 | 0.20 | 0.07 | Comparative Example |

Compound (D):

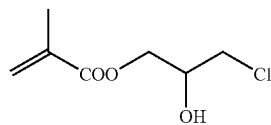

Compound (E):

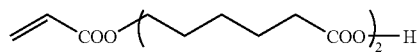

Compound (F):

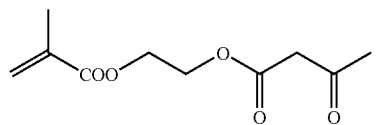

Compound (G):

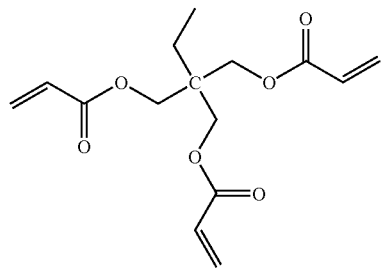

Test Examples
Test for Gas-Barrier Property in Folding:

The laminate films 4A to 4H were separately cut into 10 cm×10 cm pieces. Each piece was formed into a cylinder by bonding the two ends thereof with its surface coated with the inorganic layer and the organic layers facing outside. Two 12 mm-ϕ conveyor rollers were kept in full contact with the laminate film under a tension of about 1 N applied between the two rollers, and the laminate film was rolled and conveyed at a speed of 30 cm/min, not slipping on the rollers. Before the Test for Adhesiveness:

For the purpose of assessing the adhesiveness thereof, the laminate films were tested in a cross-cut peeling test according to JIS K5400. Briefly, the organic layer-coated surface of the laminate films 4A to 4H was cut with a cutter knife at an angle of 90° to the film surface, at intervals of 1 mm, thereby forming 100 cross cuts at intervals of 1 mm. A 2-cm wide Mylar Tape (Nitto Denko's polyester tape (No. 31B)) was stuck to it, and using a tape peeling tester, the tape was peeled off. Of the 100 cross cuts, the number (n) of the cross cuts having remained on the surface of the sample without being peeled away was counted. The results are shown in Table 2.

TABLE 2

| Laminate Film | Number of Remaining Cross Cuts (n/100) | Remarks |
|---|---|---|
| 4A | 100 | the Invention |
| 4B | 100 | the Invention |
| 4C | 98 | the Invention |
| 4D | 0 | Comparative Example |
| 4E | 6 | Comparative Example |
| 4F | 20 | Comparative Example |
| 4G | 0 | Comparative Example |
| 4H | 18 | Comparative Example |

Assessment:

Table 1 confirms the following: The gas-barrier laminate films having a laminate of an inorganic layer and an organic layer that contains a polymer having, a phosphate ester group (laminate films 3A to 3C-2) are superior to the laminate films having a laminate of an inorganic layer and an organic layer not containing a polymer having a phosphate ester group (laminate films 3D to 3H) in point of the oxygen imperviousness and the water vapor imperviousness of the folded films. Table 2 confirms the following: With no delamination, the laminate films having an organic layer that contains a polymer having a phosphate ester group (laminate films 4A to 4C) are good in point of the adhesiveness between the inorganic layer and the organic layer. From these results, it is understood that the gas-barrier laminate film of the invention, which has a laminate structure of an inorganic layer and a organic layer containing a polymer having a phosphate ester group, has improved adhesiveness between the organic layer and the inorganic layer, and when folded, the stress to the inorganic layer may be reduced and the film is not cracked, and therefore the laminate film has a good gas-barrier property.

Example 2

Fabrication of Organic EL Device Having a Substrate of Laminate Film

On the organic layer of laminate film 4C, a silicone oxide layer having a thickness of 60 nm is formed as a second inorganic layer by a vacuum vapor deposition with reaction while the amount of evaporated Si and the amount of introduced oxygen gas are controlled. The formed laminate film was put into a vacuum chamber of a DC magnetron sputtering apparatus. Using an ITO target in the apparatus, a transparent conductive layer (transparent electrode) of a thin ITO film having a thickness of 200 nm was formed on the second organic layer of the film. This is a film substrate 5C.

An aluminium lead wires was connected to the transparent electrode (ITO) of the film substrate 5C, thereby constructing a laminate structure. According to a spin-coating process, an aqueous dispersion of polyethylenedioxythiophene-polystyrenesulfonic acid (Bayer's Baytron P, having a solid content of 1.3% by mass) was applied onto the surface of the transparent electrode, and then dried in vacuum at 150° C. for 2 hours to thereby form thereon a hole-transporting, thin organic layer having a thickness of 100 nm. This is a substrate X.

On the other hand, a coating solution for light-emitting thin organic layer, having the composition mentioned below, was applied onto one surface of a temporary support of polyethersulfone (Sumitomo Bakelite's Sumilite FS-1300) having a thickness of 188 μm, using a spin coater, and then this was dried at room temperature to thereby form a thin, light-emitting organic layer having a thickness of 13 nm on the temporary support. This is a transfer material Y.

| | |
|---|---|
| Polyvinylcarbazole (Mw = 63000, by Aldrich) | 40 parts by mass |
| Tris (2-phenylpyridine) iridium complex (ortho-metallized complex) | 1 part by mass |
| 1,2-Dichloroethane | 3200 parts by mass |

The transfer material Y was put on the substrate X with the thin organic layer of the former facing the light-emitting thin organic layer of the latter, and heated and pressed between a pair of hot rollers at 160° C. and 0.3 MPa and at a rate of 0.05 m/min. With that, the temporary support was peeled away, whereby the light-emitting thin organic layer was transferred onto the upper surface of the substrate X. This is a substrate XY.

On one surface of a polyimide film having a size of 25 mm×25 mm and a thickness of 50 μm (Ube Kosan's UPILEX-50S), put was a patterned mask (having a light-emitting area of 5 mm×5 mm). According to a vapor evaporation method, Al was deposited on the film to form thereon a coating layer having a thickness of 250 nm. Further according to a vapor evaporation method, LiF was deposited thereon, having a thickness of 3 nm. Using a spin coater, a coating solution for electron-transporting thin organic film, having the composition mentioned below, was applied onto the thus-obtained laminate structure, and dried in vacuum at 80° C. for 2 hours, thereby forming an electron-transporting thin organic layer having a thickness of 15 nm on LiF. Then, an aluminium lead wire was connected to the Al electrode, and this is a substrate Z.

| | |
|---|---|
| Polyvinylbutyral 2000L (MW = 2000, by Denki Kagaku Kogyo) | 10 parts by mass |
| 1-Butanol | 3500 parts by mass |
| Electron-transporting compound having the following structure | 20 parts by mass |

Electron-Transporting Compound:

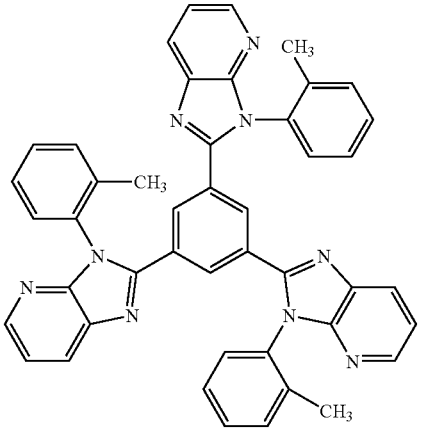

The substrate XY and the substrate Z were put on each other in such a manner that their electrodes could face to each other via the light-emitting thin organic layer therebetween. Using a pair of hot rollers, this was heated and pressed at 160° C. and 0.3 MPa and at a rate of 0.05 m/min, whereby the two substrates were stuck together to give an organic EL device.

Using Source Measure Unit 2400 Model (by Toyo Technica), a direct-current voltage was applied to the thus-obtained organic EL device, and the organic EL device well emitted light. After fabricated, the organic EL device was kept at 25° C. and a relative humidity of 10% and 90% for 12 hours each, and it was thus aged for 10 days, and then driven in the same manner as above for light emission. As a result, the device did not deteriorate at all. From the above, it is understood that the organic EL device of the invention has high durability.

The gas-barrier laminate film of the invention has a high gas-barrier capability and excellent folding resistance. Accordingly, the film may be effectively applicable to various articles that are required to be shielded from water vapor and oxygen, and to flexible articles. In addition, the invention can provide a high-definition image display device having high durability, and it is especially favorable applicable to flexible high-definition displays. Accordingly, the industrial applicability of the invention is great.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 091713/2006 filed on Mar. 29, 2006 and Japanese Patent Application No. 071291/2007 filed on Mar. 19, 2007, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a gas-barrier laminate film comprising a thermoplastic polymer film or thermosetting polymer film, and at least one organic layer and at least one inorganic layer on a surface of the thermoplastic polymer film or thermosetting polymer film, which comprises:
   forming the at least one organic layer by polymerizing a monomer composition comprising an acrylate monomer having a phosphate ester group, a methacrylate monomer having a phosphate ester group or a mixture thereof; and
   laminating the at least one organic layer and the at least one inorganic layer on the surface of the thermoplastic polymer film or thermosetting polymer film,
   wherein the at least one inorganic layer comprises an oxide, a nitride, or an oxinitride of at least one metal selected from the group consisting of Si, Al, In, Sn, Zn, Ti, Cu, Ce, Zr and Ta.

2. The method for producing a gas-barrier laminate film according to claim 1, wherein the acrylate monomer having a phosphate ester group and the methacrylate monomer having a phosphate ester group are represented by the following formula (1):

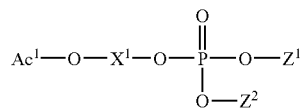

Formula (1)

wherein $Z^1$ represents $Ac^2$—O—$X^2$—, a substituent not having a polymerizable group or a hydrogen atom;
$Z^2$ represents $Ac^3$—O—$X^3$—, a substituent not having a polymerizable group, or a hydrogen atom;
$Ac^1$, $Ac^2$ and $Ac^3$ each independently represent an acryloyl group or a methacryloyl group;
$X^1$, $X^2$ and $X^3$ each independently represent an alkylene group, an alkyleneoxy group, an alkyleneoxycarbonyl group, an alkylenecarbonyloxy group, or their combination.

3. The method for producing a gas-barrier laminate film according to claim 2, wherein the monomer composition contain from 1 to 50% by mass of the monomer of formula (1).

4. The method for producing a gas-barrier laminate film according to claim 1, wherein the monomer composition contains a bifunctional acrylate monomer, a bifunctional methacrylate monomer or their mixture.

5. The method for producing a gas-barrier laminate film according to claim 1, wherein the organic layer is formed through flash vapor deposition, and the monomer composition is polymerized in a vacuum of at most 100 Pa.

6. The method for producing a gas-barrier laminate film according to claim 1, wherein the organic layer and the inorganic layer are laminated in a vacuum of at most 100 Pa.

7. A gas-barrier laminate film produced by the method of claim 1.

8. The method for producing a gas-barrier laminate film according to claim 1, wherein the organic layer is laminated on the inorganic layer.

9. The method for producing a gas-barrier laminate film according to claim 1, wherein the inorganic layer is laminated on the organic layer.

10. The gas-barrier laminate film according to claim 7, wherein the inorganic layer is laminated on the surface of the organic layer.

11. The gas-barrier laminate film according to claim 7, wherein the organic layer is laminated on the surface of the inorganic layer.

12. The gas-barrier laminate film according to claim 7, which has at least one inorganic layer and at least one organic layer on both surfaces of the substrate film.

13. The gas-barrier laminate film according to claim 7, which additionally has a transparent conductive layer.

14. The gas-barrier laminate film according to claim 7, which has an oxygen permeability at 38° C. and a relative humidity 90% of at most 0.02 ml/(m²·day·atm), and has a water vapor permeability at 38° C. and a relative humidity 90% of at most 0.01 g/(m²·day).

15. An image display device comprising a gas-barrier laminate film, wherein:
   the gas barrier laminate film comprises a thermoplastic polymer film or thermosetting polymer film, at least one organic layer on a surface of the thermoplastic polymer film or thermosetting polymer film, and at least one inorganic layer, and
   wherein the gas barrier laminate film is produced by a method comprising forming the at least one organic layer by polymerizing a monomer composition comprising an acrylate monomer having a phosphate ester group, a methacrylate monomer having a phosphate ester group or a mixture thereof.

16. The image display device according to claim 15, which is flexible.

17. The image display device of according to claim 15, which is an organic EL device.

18. A gas-barrier laminate film having at least one inorganic layer and at least one organic layer on a substrate film,
   wherein the organic layer contains at least one polymer having a phosphate ester group, and
   wherein the at least one inorganic layer comprises an oxide, a nitride, or an oxinitride of at least one metal selected from the group consisting of Si, Al, In, Sn, Zn, Ti, Cu, Ce, Zr and Ta.

* * * * *